United States Patent [19]

Fieni

[11] 4,014,565

[45] Mar. 29, 1977

[54] SAFETY BELT INSTALLATION FOR MOTOR CAR

[75] Inventor: Walter Fieni, Paris, France

[73] Assignee: Societe Anonyme Francais du Ferodo, Paris, France

[22] Filed: Aug. 21, 1974

[21] Appl. No.: 499,291

[30] Foreign Application Priority Data

Aug. 24, 1973 France .............................. 73.30777

[52] U.S. Cl. ............................................. 280/744
[51] Int. Cl.$^2$ ......................................... B60R 21/10
[58] Field of Search ......... 280/150 SB, 150 B, 744, 280/745, 748; 180/91; 188/1 C; 293/73, 62, 61

[56] References Cited

UNITED STATES PATENTS

| | | | |
|---|---|---|---|
| 3,534,979 | 10/1970 | Barecki | 280/150 SB |
| 3,804,430 | 4/1974 | Fiala | 280/150 SB |
| 3,847,426 | 11/1974 | McGettigan | 188/1 C |
| 3,871,470 | 3/1975 | Schwanz et al. | 280/744 |

Primary Examiner—Robert R. Song

[57] ABSTRACT

In a motor vehicle having a deformable structure, an installation to protect the occupants of the vehicle in case of collision thereof. The installation comprises at least one strap type safety belt anchored at its ends to the vehicle structure, and a mechanical connection between one of the anchor points and a part of said vehicle structure which is deformed upon said vehicle undergoing a collision.

11 Claims, 8 Drawing Figures

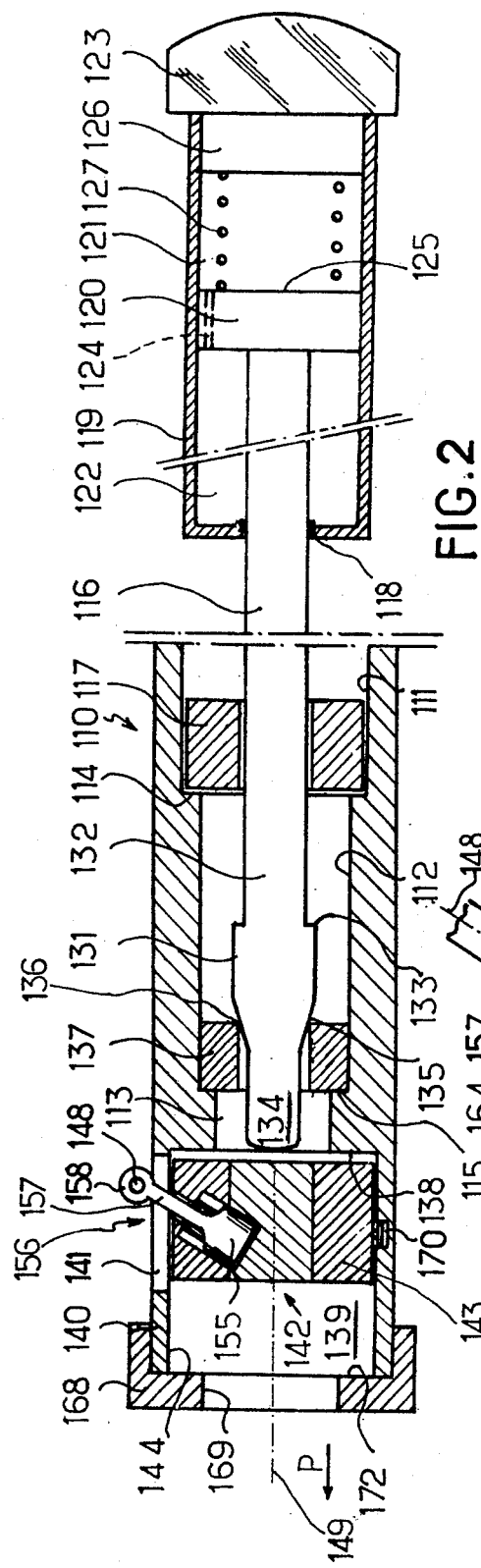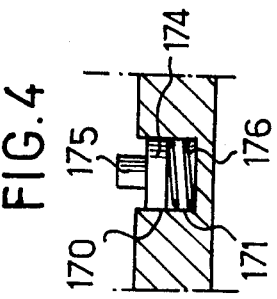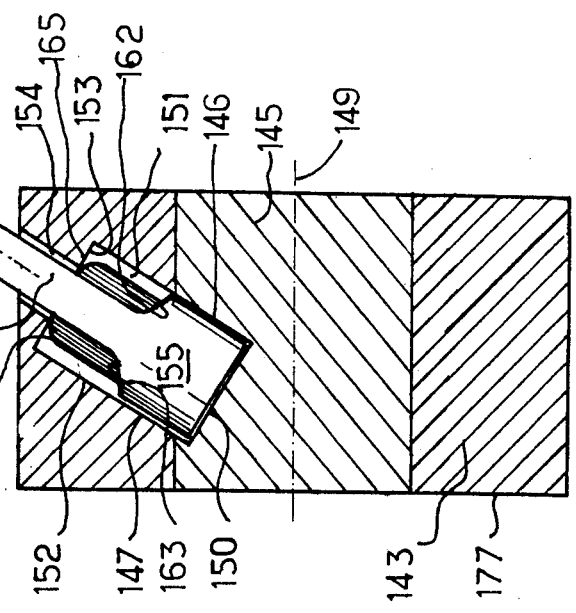

4,014,565

SAFETY BELT INSTALLATION FOR MOTOR CAR

BACKGROUND OF THE INVENTION

The invention relates to a safety belt installation for occupants of a motor car.

It has already been proposed to leave some space between a safety belt and the occupant of a vehicle equipped with said safety belt as long as the vehicle is not undergoing an important collision so that the occupant has relative freedom of movement under normal circumstances.

It has also been proposed to take up this space, even to tension the belt against the user, when important collisions take place, for example by means of a play take-up piston capable of being activated by a pressurised gas released when means controlled by inertia detection mechanisms are rendered operational. Installations which operate under such a principle require numerous complicated devices and additionally have the disadvantage of unreliability and an unacceptable risk of coming into operation at the wrong time.

It has also been proposed, in view of absorbing small impacts, to equip a motor vehicle with an impact absorber or snubber, particularly of the hydraulic type at bumper level.

SUMMARY OF THE INVENTION

An object of the invention is to provide an installation using simple and highly reliable means for giving automatic take-up of the space or play of the belt, and even tensioning of the same under big impacts.

To this end, in an installation comprising a shock snubber the latter is used to put the safety belt under tension by means of a direct mechanical connection between the snubber and at least one of the anchor points of the end of the belt.

According to an important characteristic of the invention, this mechanical connection is organised to act both as impact sensor means to determine the intensity of a collision and as means for taking up the play and/or clamping the belt.

The invention also enables tensioning of the belt to be restricted to times when the user needs to be protected from a relatively violent impact, avoiding tightening for impacts of no real danger to the occupant.

In an embodiment it is a deformation of material under the effects of impact which enables the threshold from which the belt is tensioned to be fixed accurately.

The tension also proposes an embodiment in which the front of the vehicle has a stiffness which suddenly diminishes when the belt is tensioned. The effectiveness of the protection afforded by the installation according to the invention is thus increased by increasing the absolute useful displacement of the occupant by greater deformation of the front structure of the vehicle.

BRIEF DESCRIPTION OF THE DRAWINGS

FIG. 2 is a view similar to that of FIG. 1, but of a modification;

FIG. 3 is a view on a larger scale, in section, of the slide of the modification shown in FIG. 2;

FIG. 4 is a view on a larger scale, in section, of a part of the guide wall of the slide of FIG. 3;

DESCRIPTION OF THE PREFERRED EMBODIMENTS

Figure 1:
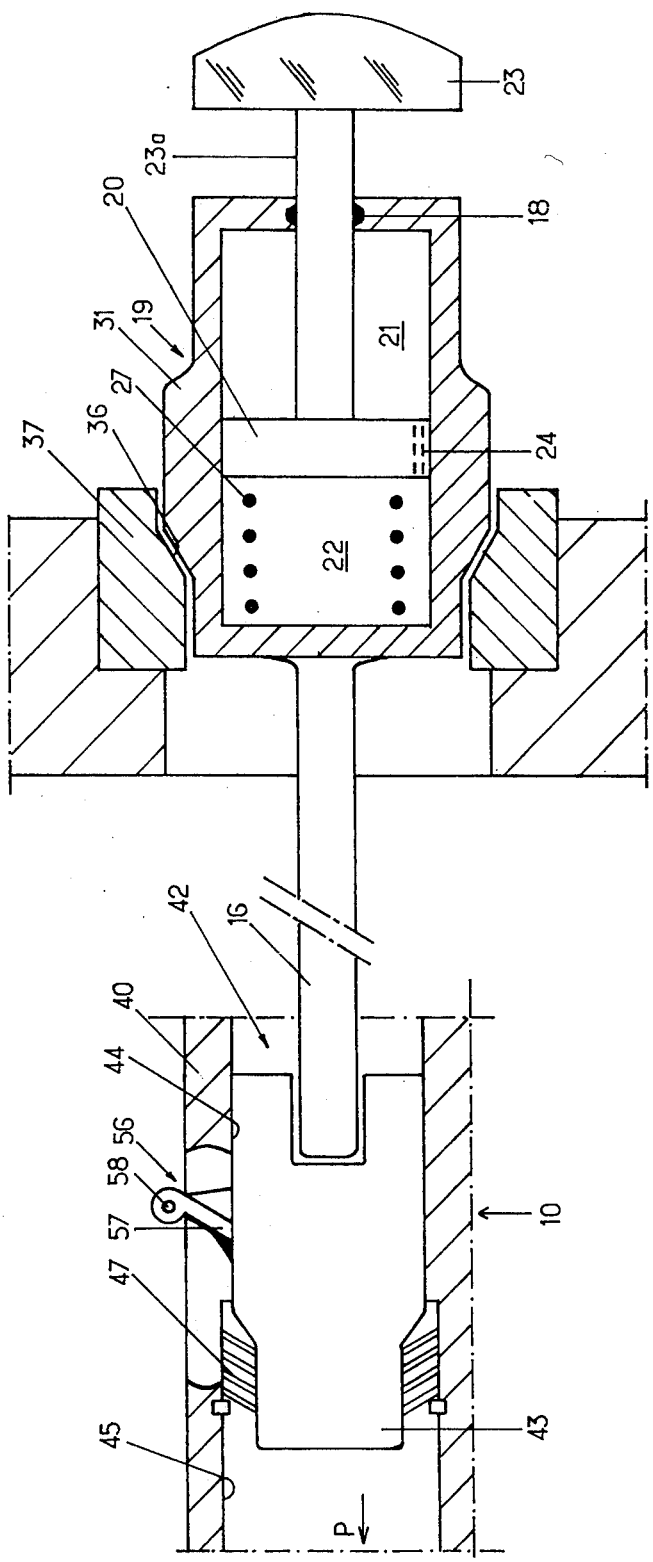
FIG. 1 is an overall view of an installation according to the invention, in longitudinal section, for a first embodiment.

Reference is first made to FIG. 1 wich shows, diagrammatically, a first embodiment of an installation according to the invention. In this embodiment, a part of the body 10 of the vehicle, for example a longitudinal member, has a longitudinal bore-hole in which is movably mounted a shaft 16. The latter is engaged, at one of its ends, in a cylindrical device 42 slidably mounted against the internal surface 44 of the wall 40 of the longitudinal bore-hole. The rear part 43 of the cylindrical device has a smaller diameter than its central and front parts whilst the wall 40 of the body 10 has a rear part 45 of larger diameter than its front part. In the installation position shown in FIG. 1, which corresponds to the position in the absence of impact, or of impact of high force, elastic washers 47, for example Belleville washers, are positioned between parts 43 and 45, said washers permitting movement without hindrance of the cylindrical device 42 in the direction of arrow p which is from front to back of the vehicle, but preventing any return of the cylindrical device 42 in the opposite direction.

Integral with the cylindrical component 42 there is a device 56 for anchoring the end of a safety belt comprising a reinforced stalk 57 fixed onto the cylindrical device 42 and finished by an eye 58 for fastening the strap forming the belt.

At the opposite end from where it cooperates with device 42, the shaft 16 is fixed to the cylindrical pot 19 of a hydraulic snubber comprising a piston 20, slide mounted in said pot, and forming a front chamber 21 and a rear chamber 22 both filled with liquid and communicating with each other by narrow channels 24 drilled through the piston 20. Integral with the latter, by means of a shaft 23a, is a bumper 23, a seal ring 18 being provided at the point of intersection of the front wall of the cylinder 19 by said shaft. A spring 27, placed in the rear chamber 22, constantly pushes the piston 20 away from the rear transverse wall of the cylindrical pot 19, i.e. towards the front of the vehicle. On its external face, the cylindrical pot 19 has a flare 31 which, in the position shown in FIG. 1, i.e. in the absence of impact, is in contact with the front inside part 36 of a fixed ring 37 of material of calibrated deformation, for example of polyurethane, or of ductile metal, which holds the cylindrical pot 19.

Operation of the installation is as follows:

If there are small frontal impacts, the hydraulic impact snubber or absorber comprising the cylinder 19 and the piston 20 deadens the impact by forcing the liquid passing from chamber 22 to chamber 21 through channels 24.

For more violent impacts, the stiffness of the hydraulic absorber increases and the cylinder 19 tends to move inside the ring 37. As long as the force of these impacts does not reach a determined level the cylinder 19 remains stationary and it is only when the force of the impact exceeds this level that the flare 31 passes through the ring 37 deforming it; simultaneously, the shaft 16 pushes back the cylindrical device 42 and with it the anchor device 56, which has the effect of taking up the play and then of tensioning the safety belt. When both the restraining forces exerted by the latter on the anchor device 56 become too great and the driving force of the shaft 16 still persists, the shaft breaks and the cylinder device 42, with which the anchor device 56 is integral, then remains fixed in the position reached in the preceding phase, all movement from back to front, i.e. in the direction opposite to that shown by arrow p, being prevented by washers 47 now jammed.

Thus, by simple and highly reliable means, the invention enables the play in the strap forming the safety belt to be taken up, and even tensioned, when big impacts are suffured by the vehicle equipped with the installation.

Reference is now made to FIGS. 2 to 6 relating to another embodiment of an installation in accordance with the invention. In this embodiment, a part of the body 110 of the vehicle, for example a longitudinal member, has a longitudinal bore-hole the front portion 111 of which has a larger diameter than a middle portion 112, itself of larger diameter than a rear portion 113 thus forming annular shoulders 114 and 115. A shaft 116 coaxial with the bore-hole 111-112-113, is slide mounted in a tubular cross member 117 adjacent to the shoulder 114. The front part of shaft 116 penetrates, with insertion of seal ring 118, into the interior of a cylinder 119 and it is integral at the end with a hydraulic absorber piston 120 having a front chamber 121 and a rear chamber 122. A bumper 123 is integral with cylinder 119. There is a spring 127 between the front face 125 of the piston which is perforated with longitudinal channels 124 and a stud 126.

The rear part of shaft 116 has a flare 131 connected to the shaft body 132 by an annular shoulder 133 and the flare 131 is connected to a rear end 134 of the shaft by a frusto-conical part 135. In normal conditions, i.e. in the absence of impact, the frusto-conical part 135 is by construction in contact with the front internal face 136 of a ring 137 in material of calibrated deformation, for example in polyurethane or in ductile metal. The end 134 projects in relation to the ring 137 and is flush with the front annular face 138 of a rear cavity 139, forming an extension of portion 113 of the bore-hole, the wall 140 of which has a longitudinal slot 141.

In the cavity 139 a cylindrical device 142 is located which comprises a ring 143, FIG. 3, slide mounted against the internal surface 144 of the wall 140. In the ring 143 a core 145 is mounted, with slide means, this has a groove 146 limited by a flat surface 150 and by a cylindrical surface 147, the axis of which 148, oblique in relation to axis 149 of the longitudinal member 110 and shaft 116, faces forwards and upwards.

The groove 146 in core 145 is extended by a housing 151 in the ring 143, this housing being limited by a cylindrical surface 152 extending the cylindrical surface 147 and a surface 153 opposite to surface 150. Housing 151 opens upwards by a passage 154 ending in the longitudinal slot 141.

Located in the cylindrical cavity formed by the groove 146 and housing 151 is the cylindrical base 155 of an anchor device for the end of a safety belt 156 which comprises a stalk 157 extending from the base 155, passing through the passage 154 and the slot 141 and ending in an eye 158 for fastening the strap forming the belt. Around the stalk 157 there is a sleeve 161, advantageously made of elastomer material, the bottom front face 162 of which is in contact with the advantageously frusto-conical shoulder 163 of the base 155 and the top front face 164 is in contact with the top surface 165 of housing 151.

The rear open end of the longitudinal member is covered with a lid 168 having in its centre an opening 169 coaxial with the longitudinal member 110 and of larger diameter than the core 145.

In the wall thickness 140 there are one or several blind holes 170, FIG. 4, the rear generatrix 171 of which is a distance very slightly greater than the thickness of the ring 143 from the internal face 172 of the lid 168. A cylindrical plug 174 is located in a hole 170 having an interior pin 175, subject on its lower face to the action of a spring 176 bearing on the bottom of the hole 170.

In a modification, not shown, several rows of plugs are provided to oppose the return of the ring 143 even if it does not abut against the internal face 172 of the lid 168.

Operation of the installation is as follows:

If there are small frontal impacts, the hydraulic impact absorber comprising the cylinder 119 and the piston 120 deadens the impact by forcing the liquid from chamber 121 to chamber 122 through channels 124. For more violent impacts, the stiffness of the hydraulic absorber increases and the shaft 116 tends to move inside the tubular longitudinal member 110. As long as the force of these impacts does not reach a predetermined level, the ring 137 opposes movement of the shaft 116. It is only under impacts the force of which exceeds said predetermined level that the flare 131 can pass through the ring 137 by deforming it and the rounded end 134 of the shaft 116 pushes back the sliding device 142. The flare 131 ring unit therefore plays the part of detector or sensor means for the force of impacts suffered by the vehicle.

Figure 5:
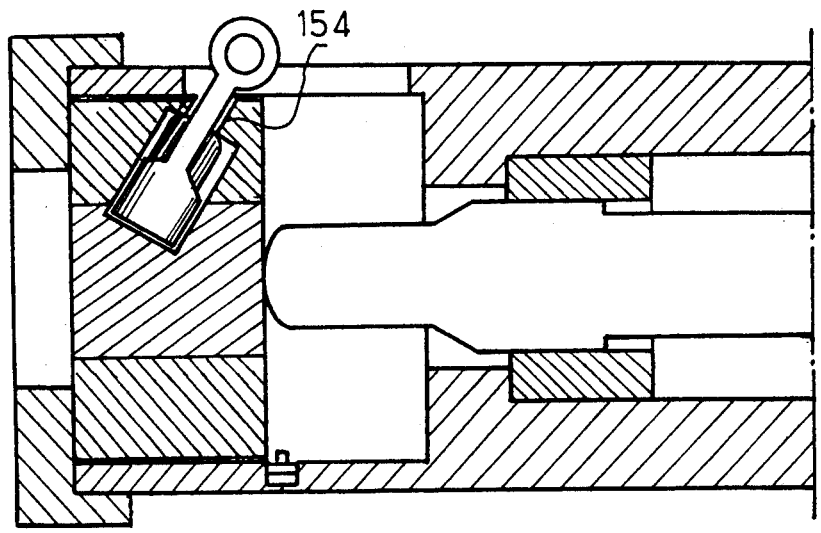
FIGS. 5 and 6 are section views of part of the installation of FIG. 2 in two other positions.

For heavy impacts, the sliding device 142 moves in the direction shown by arrow p and the anchor device 156, by its movement towards the rear of the vehicle, applies the strap forming the safety belt against the body of the user, who up till that moment has had the desired freedom for driving the vehicle, or for ease of movement. Abutment of the back face 177 of the ring 143 against the lid 168 corresponds with application of the strap against the body of the user under the envisaged tension. During this movement of the sliding device 142, interlocking between the core 145 and the sleeve 143 is ensured by the base 155 of the anchor device 156, the transverse section of which can be lengthened; and which performs the function of keybolt, the exterior surface of the device moving against the plugs 174. At the end of the travel, the lugs 175 are exposed and under the action of springs 176 project in relation to the internal surface 144 of the wall 140 and prevent the return forwards of the sliding equipment 142. This position of the installation is shown in FIG. 5.

Figure 6:
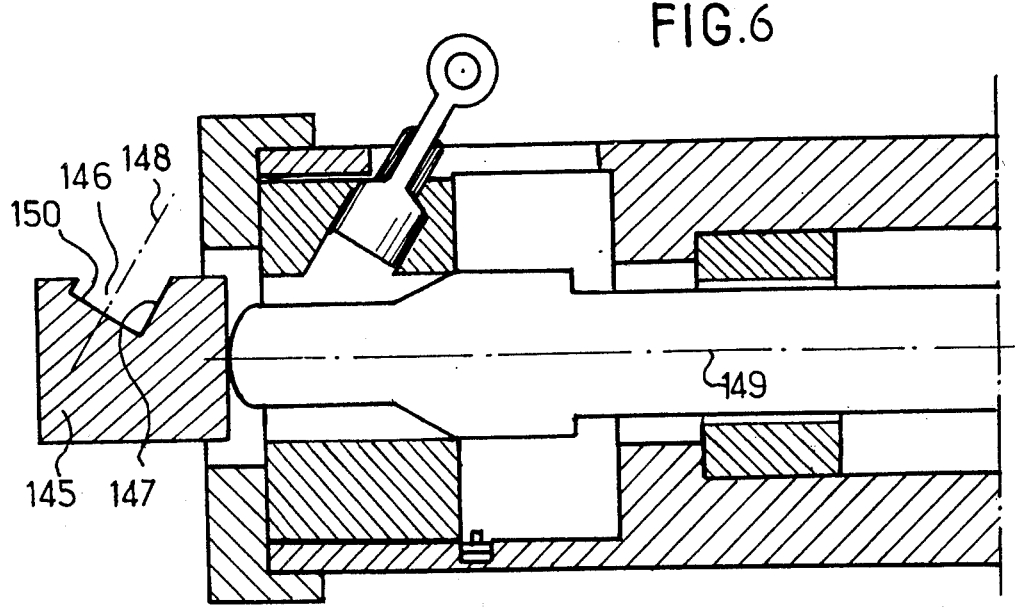

Projection by inertia towards the front of the vehicle of the body of the user wearing the belt tends to extract the anchor device 156 from the cavity of the slide device 142, in which it is housed. The elastomer sleeve 161 opposes this extraction. If the traction force is of such a level as to cause crushing of said elastomer, the base 155 comes out of the groove 146 in the core 145, in such a way that the interlocking between it and the ring 143 is eliminated. The core 145 can then no longer oppose the thrust of the shaft 116, so that it resumes its backwards movement expelling the core 145 through the opening 169 in the lid 168. The position of the installation is then as shown in FIG. 6. In this way the effectiveness of the protective installation is increased by increasing the absolute useful displacement of the occupant thanks to an increase in the useful fraction of deformation of the vehicle's structure.

Figure 7:
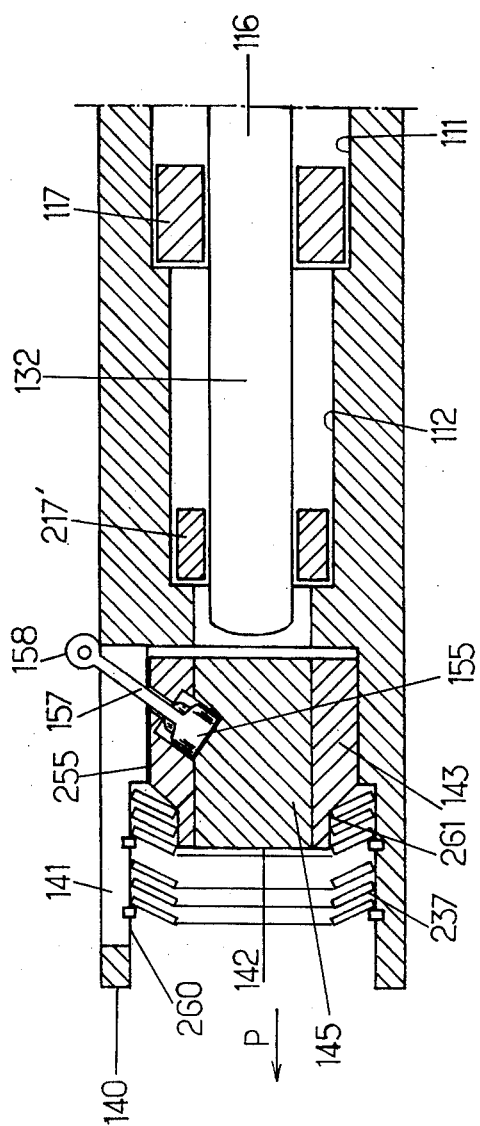
FIG. 7 is a view similar to that of FIG. 1, but of another embodiment.

FIG. 7 shows a modification of the embodiment of FIGS. 2 to 6 wherein the parts identical to those of the previous embodiment have the same references as in FIGS. 2 to 6. In this modification, the means of sensing the force of the impacts undergone by the vehicle are formed of washers 237, for example Belleville washers, positioned between a widening 260 of the wall 140 and the ring 143 of the sliding unit 142, there being a conical ramp 261 at the rear end of the ring 143 to help the washers assume a conical shape. These also have an anti-return function for the ring 143, in a similar manner to the plugs 174 of FIG. 2.

Operation of this modified installation is similar to that of the installation in FIG. 2; in case of heavy impact the front structure of the vehicle drives the shaft 116 which in its turn drives the sliding device 142. If displacement of the latter is such that the tension imparted to the webbing exceeds said predetermined level the core 145 is unlocked from the ring 143 by exit of the base 155, the shaft 116 continuing its advance in the direction of the arrow p without continuing to tighten the strap forming the belt.

Figure 8:
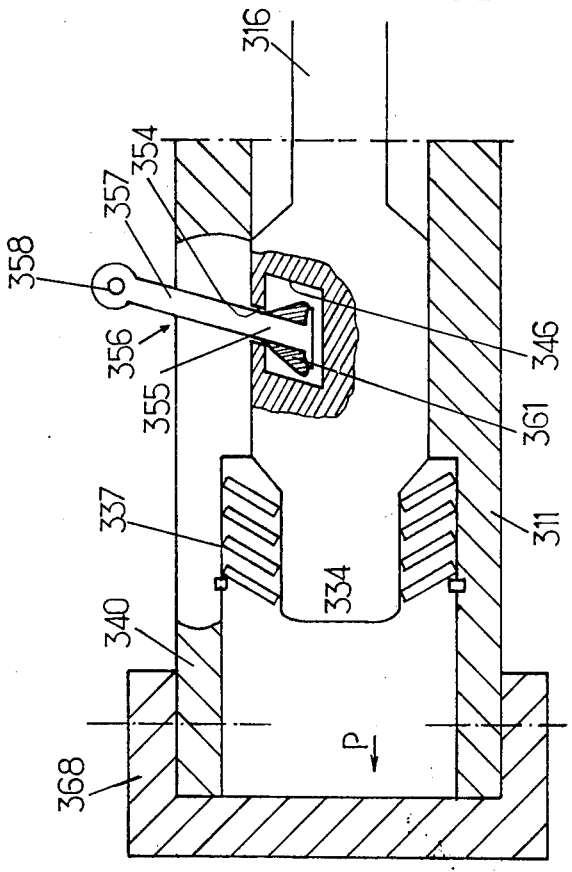
FIG. 8 is a view similar to that of FIG. 1, but of yet another embodiment.

Reference is now made to FIG. 8 which shows a modification of the embodiments of FIGS. 2 and 7 in which the shaft 316, similar to shaft 116 of the previous embodiments, comprises a cavity 346 in the vicinity of its rear end which opens to the outside by a passage 354. The base 355 and a part of the stalk 357 of a device 356 for anchoring one end of the safety belt are located in the cavity 346. Around the stalk 357 there is a conical sleeve 361, advantageously in elastomer. Between the rear end 334 of the shaft 316 and the wall 340 of the longitudinal bore-hole in which the shaft 316 is slidably mounted there are washers 337 the function of which is identical to that of washers 237 of the embodiment according to FIG. 7. A rear end 368, solidly fixed to the wall 340, covers the rear opening of the bore-hole in which the shaft 316 is housed.

Operation of this modified installation is as follows:

When a heavy impact is suffered by the vehicle equipped with the installation, the shaft 316 moves in the direction of arrow p against the washers 337 until it abuts against the rear 368. This backward movement of the shaft 316 and of the anchor device 356 which is joined to it cause take-up of the play and tensioning of the strap forming the belt. After abutting against the rear end 368, the shaft 316, on which the driving effect is still being exerted, deforms by buckling with modification of the rigid structure of the vehicle into a "soft" structure. The washers 337 prevent any return movement of the end 334 of the shaft 316 in the opposite direction to that shown by the arrow p.

If, during the movement of the shaft 316 in the direction of the arrow p the tension of the belt reaches too high a level or if, after tensioning, due to the projection forwards of the occupant of the vehicle, the restraining force reaches too high a level, the stalk 357 of the anchor 356 moves in the direction tending to extract said stalk from the cavity 346, to limit the restraining force on the occupant, by squeezing the conical sleeve 361 into the passage 354, possibly until the base 355 of the shaft 357 abuts against the bottom of said passage.

In such an embodiment, the installation can have a force limitation function, so that a specific device designed to ensure this limitation does not have to be contemplated on the actual safety belt.

What I claim is:

1. An installation to protect an occupant of a motor vehicle in case of a collision of said vehicle, said installation comprising a deformable vehicle structure, at least one strap type safety belt, means for anchoring said belt at its ends to said vehicle structure, a movable mechanical connection between one of said anchoring means and a part of said vehicle structure which is deformed upon said vehicle undergoing a collision, said mechanical connection being adapted to tension said belt when it is moved in a predetermined manner in response to a collision deforming said vehicle structure, and means for sensing collisions as to their force, said sensing means being connected to said mechanical connection to prevent movement thereof in said predetermined manner when the force of a collision is less than a predetermined value, said sensing means comprising at least one elastic member disposed between a fixed part of the vehicle and a part of said mechanical connection.

2. An installation according to claim 1, wherein said part which is deformed upon the vehicle undergoing a collision is a bumper part of the vehicle.

3. An installation according to claim 1, wherein said sensor means comprise a sensor ring of deformable material and a flare on a member of said mechanical connection, the diameter of the flare which is adapted to cooperate with said ring being larger than that of the opening of said ring which opposes penetration of the flare into the ring as long as the force on said flare does not exceed a predetermined value.

4. An installation according to claim 1, wherein said mechanical connection is adapted to move said one anchoring means to tension said belt, and further comprising means prohibiting any return movement of said anchor means under the effect of projection of the occupant towards the front of the vehicle after taking up of the play which normally exists between the occupant and the strap.

5. An installation according to claim 4, wherein said means prohibiting return movement of said anchor means comprises plugs subject to the action of an elastic force.

6. An installation according to claim 4, wherein means are provided to release said means for prohibiting return of said anchor means when the traction force exerted by the anchor means exceeds a predetermined value.

7. An installation according to claim 1, comprising at least one hydraulic snubber mounted on the part of the vehicle which is deformed upon collision, a mobile part of said snubber being joined to said connection and said snubber being connected to said sensor means which enable it to activate said mechanical connection when said vehicle undergoes a collision the force of which exceeds a predetermined value.

8. Installation according to claim 7, wherein the cylinder of said hydraulic snubber has a flare the diameter of which is greater than that of the opening of a sensor ring.

9. Installation according to claim 7, further comprising as sensor means an elastic member positioned between the cylinder of said hydraulic snubber and a fixed cavity in which said cylinder is movably mounted.

10. An installation according to claim 1, further comprising, connected to said strap, a device for limiting the tensioning of said strap, said device being connected to said anchor means.

11. An installation according to claim 1, wherein the mechanical connection comprises a sliding device having a central core cooperating with a thrust shaft and having a peripheral ring surrounding said core, the core and ring assembly being effected by the anchor means, the latter comprising a base housed in a cavity formed partially in the core and partially in the ring, said anchor means having an eye connected to said base by a stalk passing through a longitudinal slot of a tubular longitudinal member surrounding said shaft.

* * * * *